United States Patent
Endara (10) Patent No.: US 12,169,035 B2
(45) Date of Patent: Dec. 17, 2024

(54) CLAMP EQUIPPED NOZZLE AND QUICK CONNECTORS

(71) Applicant: Rene Ricardo Endara, East Moriches, NY (US)

(72) Inventor: Rene Ricardo Endara, East Moriches, NY (US)

( * ) Notice: Subject to any disclaimer, the term of this patent is extended or adjusted under 35 U.S.C. 154(b) by 224 days.

(21) Appl. No.: 17/864,566

(22) Filed: Jul. 14, 2022

(65) Prior Publication Data

US 2022/0349495 A1 Nov. 3, 2022

Related U.S. Application Data

(63) Continuation-in-part of application No. PCT/US2021/013234, filed on Jan. 13, 2021.

(60) Provisional application No. 62/995,181, filed on Jan. 15, 2020.

(51) Int. Cl.
*F16L 3/02* (2006.01)
*B05B 15/60* (2018.01)
*B05B 15/65* (2018.01)

(52) U.S. Cl.
CPC ............... *F16L 3/02* (2013.01); *B05B 15/60* (2018.02); *B05B 15/65* (2018.02)

(58) Field of Classification Search
CPC ... F16L 3/02; F16L 3/13; F16L 15/006; B05B 15/60; B05B 15/65; B05B 1/04; B05B 1/06; B65H 2701/33; B65H 75/36
See application file for complete search history.

(56) References Cited

U.S. PATENT DOCUMENTS

| | | | | |
|---|---|---|---|---|
| 1,007,657 | A | * | 10/1911 | Freund ................. B05B 15/625 248/83 |
| 1,078,817 | A | * | 11/1913 | Austin ................. B05B 15/622 248/85 |
| 1,519,018 | A | | 12/1924 | Boudreau |
| 1,816,301 | A | | 7/1931 | Sundell |
| 2,419,393 | A | * | 4/1947 | Doyle ................... A62C 31/28 239/543 |

(Continued)

FOREIGN PATENT DOCUMENTS

WO 2018195026 A1 10/2018

OTHER PUBLICATIONS

International Search Report mailed Mar. 25, 2021 and Written Opinion completed Feb. 17, 2021 corresponding to counterpart Int'l Patent Application PCT/US21/13234.

*Primary Examiner* — David M Upchurch
(74) *Attorney, Agent, or Firm* — Carter, DeLuca & Farrell, LLP; Francesco Sardone (57) ABSTRACT

A clamp equipped nozzle for enabling spooling of a hose includes a body defining a lumen having a central axis and configured to enable fluid to flow therethrough. A fluid outlet is in fluid communication with the body and is disposed at a first end of the body. The fluid outlet is configured to enable fluid to flow out of the clamp equipped nozzle defining a flow pattern. A coupler is configured to couple the body to an end of the hose and is disposed at a second end of the body. A clamp is configured to retain a section of the hose and is disposed along a longitudinal portion of the body. The clamp includes walls in a cylindrical configuration, the walls defining a longitudinal length that is approximately parallel the body.

20 Claims, 10 Drawing Sheets

(56) References Cited

U.S. PATENT DOCUMENTS

| | | | | |
|---|---|---|---|---|
| 2,723,431 A | * | 11/1955 | Di Renzo | B65H 75/366 |
| | | | | 24/339 |
| 2,799,907 A | * | 7/1957 | Kohtz | F16L 3/237 |
| | | | | 24/339 |
| 3,439,943 A | | 4/1969 | Thorne-Thomsen | |
| 3,636,595 A | | 1/1972 | Wines | |
| 5,027,478 A | * | 7/1991 | Suhr | F16L 3/223 |
| | | | | 24/339 |
| 5,697,129 A | * | 12/1997 | Newville | B25F 1/02 |
| | | | | 24/339 |
| D660,690 S | * | 5/2012 | Mixides | D8/396 |
| 8,562,512 B2 | * | 10/2013 | Menn | A61B 1/0014 |
| | | | | 600/102 |
| 10,144,123 B1 | * | 12/2018 | Shaw | B25H 3/003 |
| 10,859,186 B2 | * | 12/2020 | Angus | F16L 57/005 |
| 10,883,637 B2 | * | 1/2021 | Endara | F16L 33/222 |
| 2020/0032937 A1 | * | 1/2020 | Endara | F16L 3/223 |

* cited by examiner

CLAMP EQUIPPED NOZZLE AND QUICK CONNECTORS

CROSS-REFERENCE TO RELATED APPLICATION

The present application is a Continuation-in-Part Application claiming the benefit of and priority to International Patent Application No. PCT/US2021/013234, filed Jan. 13, 2021, which claims the benefit of and priority to U.S. Provisional Patent Application Ser. No. 62/995,181 filed on Jan. 15, 2020, the entire content of which is incorporated herein by reference.

TECHNICAL FIELD

The present disclosure relates generally to nozzles, spray heads, and similar fluid outlets, and, more specifically, to a nozzle equipped with a clamp, cuff, or a quick winding assistance device (Q.W.A.D.™), which can connect to tubular structures to facilitate spooling or winding thereof, and methods of using the same.

BACKGROUND

There are a variety of devices that allow for spooling or winding of tubular structures for transporting fluids, such as hoses, flexible pipes or conduits, and the like. Many of these solutions, such as garden hose reels with crank systems, are bulky and awkward to use. Additionally, many of these spooling or winding devices cause kinks or twists in the tubular structure being wound. Often, a variety of nozzles or spray heads are also used to make the fluid flow exiting the tubular structures more desirable. The present disclosure provides for nozzles, spray heads, and tubular structure couplers with a clamp for simple spooling that limits the bulkiness of traditional spooling devices, reduces kinks and twists that are a result of traditional spooling devices, and reduces the number of accessories for tubular structures users may otherwise have to purchase or use separately.

SUMMARY

This disclosure relates to a clamp equipped nozzle for enabling spooling of a hose. The clamp equipped nozzle includes: a body defining a lumen having a central axis and configured to enable fluid to flow therethrough; a fluid outlet in fluid communication with the body, the fluid outlet disposed at a first end of the body, the fluid outlet configured to enable fluid to flow out of the clamp equipped nozzle defining a flow pattern; a coupler configured to couple the body to an end of the hose, the coupler disposed at a second end of the body; and a clamp configured to retain a section of the hose, the clamp disposed along a longitudinal portion of the body, the clamp including walls in a cylindrical configuration.

In aspects, the walls of the clamp may define a cylindrical C-shaped channel. The channel may have a diameter from about 9 millimeters to about 20 millimeters.

In further aspects, the coupler and fluid outlet may be collinear with the central axis.

In other aspects, the walls may define a pair of arms, wherein ends of the arms of the clamp are spaced apart to define a longitudinal opening configured to permit a section of the hose to be inserted into the clamp, the arms configured to snap-fit the hose.

In some aspects, the clamp may include a rubber pad configured to bias a section of hose to be clamped against inner surfaces of the walls.

In additional aspects, the coupler may be a female threaded cap configured to couple to a male threaded end of the hose to be retained by the clamp, the female threaded cap may be configured to rotate about a central axis of the coupler.

In yet other additional aspects, the coupler may be a male threaded coupler configured to be thread-ably inserted into a female threaded end of the hose to be retained by the clamp.

In aspects, the fluid outlet may be configured to permit fluid to flow out of the body in a jet, cone, center, full, sprinkler, mist, flat, multi-stream, or soaker flow pattern.

In further aspects, the fluid outlet may be configured to couple to another end of the hose to be clamped or to a different hose or faucet.

In an aspect, the clamp equipped nozzle may be used in combination with a quick connect coupler having a male coupler and a female coupler, wherein one of the male coupler and the female coupler of the quick connect coupler is configured to couple to another end of the hose to be clamped or to a different hose or faucet, wherein the quick connect coupler is configured to fluidly connect to the clamp equipped nozzle. The quick connect coupler may include a quick connect coupler clamp configured to retain a section of the hose, the quick connect coupler clamp including walls in a cylindrical configuration, the walls of the quick connect coupler clamp defining a longitudinal length that is approximately parallel the body, the quick connect coupler clamp disposed along a longitudinal portion of a body of the quick connect coupler.

In alternative aspects, the clamp equipped nozzle may include a plurality of clamps, each clamp of the plurality of clamps configured to retain a section of the hose.

In further alternative aspects, each clamp of the plurality of clamps may be disposed radially about the central axis of the body.

In other alternative aspects, at least two clamps of the plurality of clamps may be configured to define a different diameter from one another to retain hoses having different diameters.

In aspects, the body, coupler, fluid outlet, or clamp may be made of plastic, rubber, metal or a combination thereof.

In an aspect, the clamp includes a first cuff having a C-shaped channel configured to snap-fit engage a portion of a hose, and a second cuff having a C-shaped channel configured to snap-fit engage the body of the nozzle.

This disclosure also provides a clamp equipped quick connect coupler for enabling spooling of a hose including a body, a first coupler and a second coupler disposed at opposite ends of the body, and a clamp. The first coupler, second coupler, and body define a lumen through which a fluid may flow. The clamp has a cuff defining a channel configured to receive a tubular portion of the hose, the cuff including a longitudinal length parallel to the body. The clamp is disposed about a periphery of the body.

In aspects, the clamp may be configured to snap-fit the tubular portion of the hose.

In other aspects, the clamp may include a plurality of cuffs disposed about the periphery of the body, each cuff of the plurality of cuff configured to receive different tubular portions of the hose.

In some aspects, the channel of the cuff may include a diameter from about 9 millimeters to about 20 millimeters.

In aspects, the first coupler and second coupler are either male and female, both male, or both female type couplers.

In further aspects, the body, first coupler, second coupler, or clamp are made of plastic, rubber, metal or a combination thereof.

In an aspect, the clamp includes a first cuff having a C-shaped channel configured to snap-fit engage a portion of a hose, and a second cuff having a C-shaped channel configured to snap-fit engage the body of the quick connect coupler.

This disclosure also relates to a hose assembly including a hose and a clamp equipped nozzle. The hose includes an elongate flexible tubular body defining a first end and a second end. The clamp equipped nozzle includes: a body defining a lumen having a central axis and configured to enable fluid to flow therethrough; a coupler disposed at a first end of the body, the coupler configured to couple the body to either the first end or the second end of the hose; a fluid outlet in fluid communication with the body, the fluid outlet disposed at a second end of the body, the fluid outlet configured to enable fluid to flow out of the clamp equipped nozzle defining a flow pattern; and a clamp disposed along a longitudinal portion of the body, the clamp including walls in a cylindrical configuration such that the clamp is configured to retain a section of the hose to enable reel-less winding of the hose.

BRIEF DESCRIPTION OF THE DRAWINGS

The accompanying drawings, which are incorporated in and constitute a part of this specification, illustrate aspects of the disclosure and, together with a general description of the disclosure given above and the detailed description given below, serve to explain the principles of the disclosure, wherein.

DETAILED DESCRIPTION

Aspects of the present disclosure are described in detail concerning the drawings, in which like reference numerals designate identical or corresponding elements in each of the several views.

A "hose" as used herein refers to elongate tubular structures used for transporting fluids or creating a passageway for fluids and includes hoses, flexible conduits, flexible pipes, and the like. The hose may be of any size, material, or use, such as a garden hose, fire hose, or compressed air conduit. While reference herein is made generally to a hose, it is to be understood that any elongate tubular structure as defined above is included and within the scope of this disclosure.

Referring generally to FIGS. 1-7, a clamp equipped nozzle 100 includes a clamp 110, a fluid outlet 120, a coupler 130, and a body 140. The clamp equipped nozzle 100 is configured to couple to an end of a hose 10 and enables and assists with reel-less spooling (i.e., winding) of the hose 10. Body 140 of nozzle 100 is configured to enable fluid to pass through a lumen 142 of the body 140. Clamp 110 of nozzle 100 is disposed on a radial, outside portion of body 140, and fluid outlet 120 and coupler 130 of nozzle 100 are coupled to opposite ends of the body 140. The clamp equipped nozzle 100 couples to a hose end 12 of the hose 10 via coupler 130. A hose section 14 may then be inserted into the clamp 110 such that the hose 10 may be easily spooled.

In aspects, the clamp equipped nozzle 100 may be provided with a hose to define a hose assembly. Multiple clamp equipped nozzles 100, such as clamp equipped nozzles 100a, 100b, 100c, 100d (see FIGS. 4-7), and multiple individual hoses, may be provided with the hose assembly.

Figure 1:
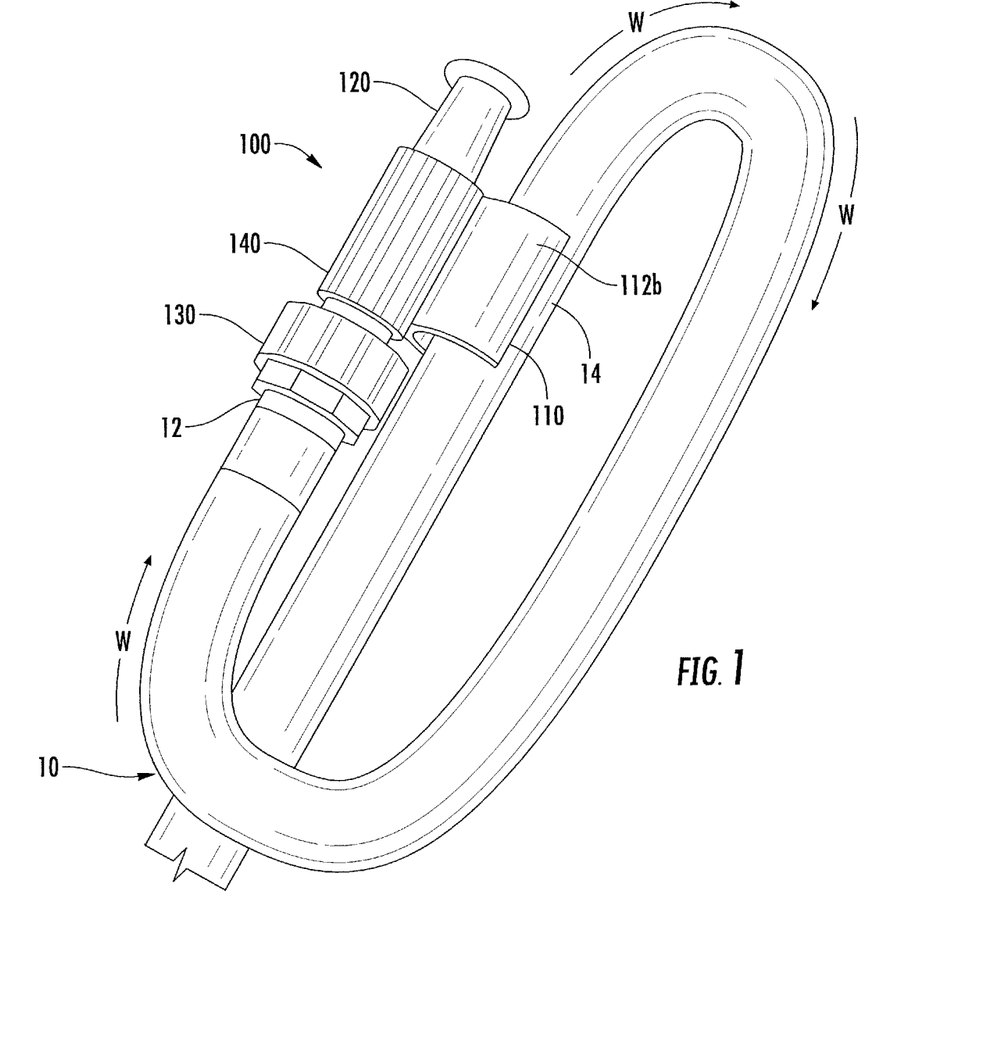
FIG. 1 is a top perspective view of a clamp equipped nozzle operatively coupled to a hose according to an aspect of this disclosure.
Figure 2:
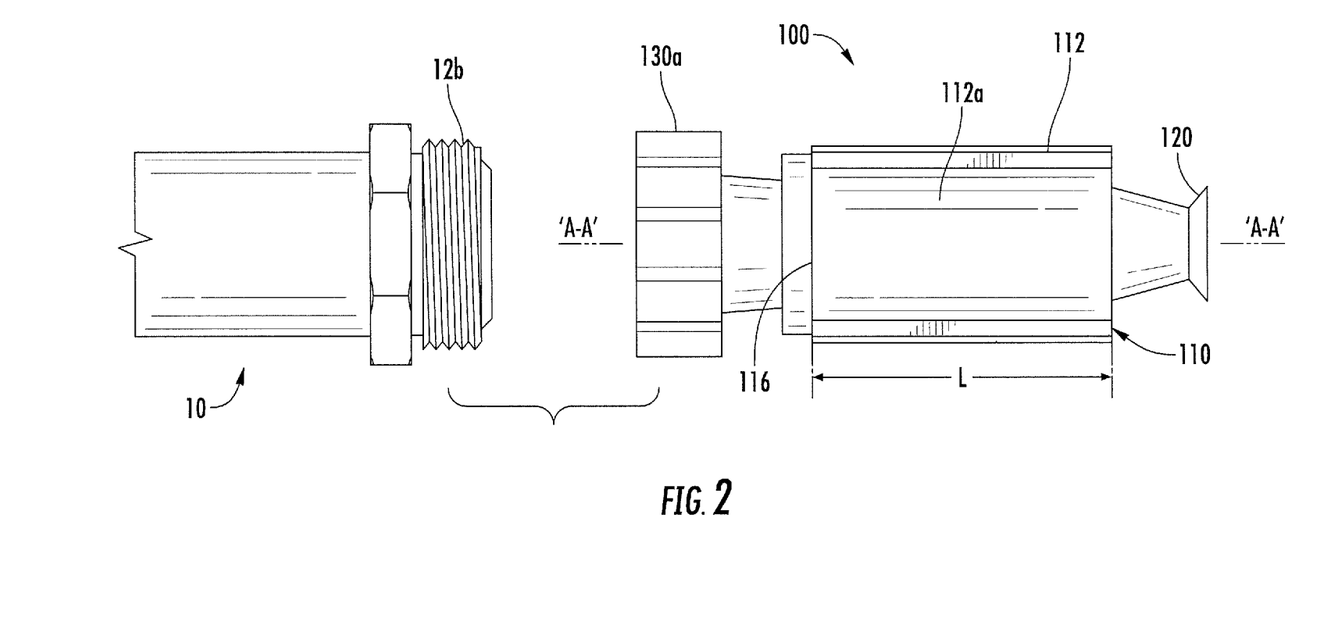
FIG. 2 is a side view of the clamp equipped nozzle of FIG. 1 separated from the hose.
Figure 8:
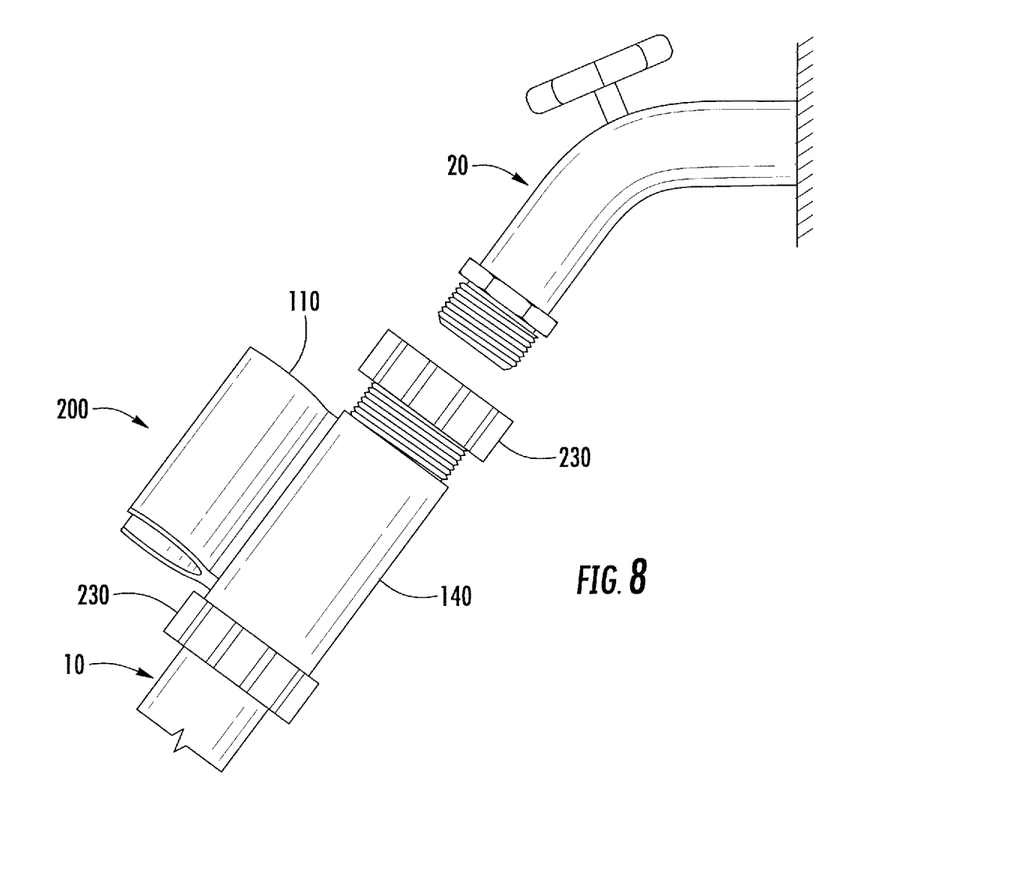
FIG. 8 is a side perspective view of a clamp equipped nozzle configured to couple to a hose and a faucet/spiget in accordance with aspects of this disclosure.

With reference to FIGS. 1-2, the clamp equipped nozzle 100 is configured to be removably coupled to a hose end 12 of hose 10 via coupler 130 thereof. When the clamp equipped nozzle 100 is coupled to the hose end 12, fluid is able to flow through the hose 10 and the clamp equipped nozzle 100. In aspects, coupler 130 may be configured to couple directly to a faucet, spigot or spout (see FIG. 8).

Coupler 130 of the clamp equipped nozzle 100 may include a female threaded coupler 130a configured to couple to a male threaded end 12b of hose 10. In aspects, coupler 130 may include a male threaded coupler 130b (see FIG. 5) configured to couple to a female threaded end (not shown) of hose 10. Coupler 130 includes a diameter "D1" that is approximately the same as a diameter of the hose end 12. Coupler 130 may be configured to couple to any diameter hose end 12. For example, coupler 130 may be configured to couple to an 8-millimeter (mm) compressed air hose end. In another example, coupler 130 may be configured to couple to standard garden hose ends that typically have a diameter of ⅜ inch (in) (about 9.5 mm), ½ in (about 12.7 mm), ⅝ in (about 15.8 mm), or ¾ in (about 19 mm).

Figure 3A:
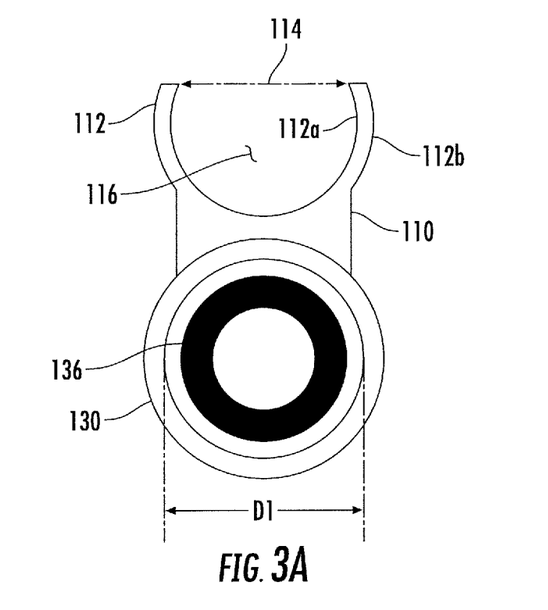
FIG. 3A is a front view of the clamp equipped nozzle of FIG. 1.
Figure 3B:
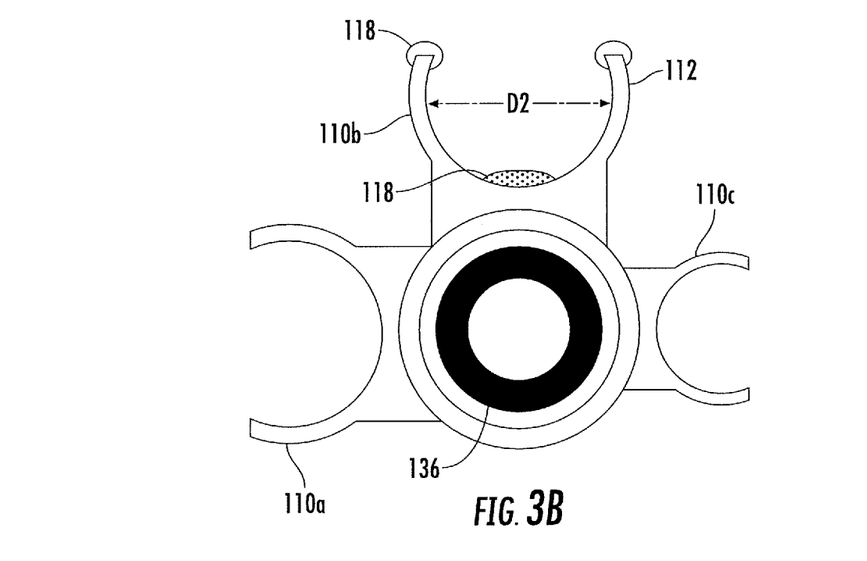
FIG. 3B is a front view of a clamp equipped nozzle in accordance with another aspect of this disclosure.

Coupler 130 may be a screw cap and may include a washer 136 (see FIGS. 3A-B). Coupler 130 is freely-rotatable about a central axis 'A-A' of body 140 of the clamp equipped nozzle 100, such that coupler 130 may be threaded onto hose end 12b. In aspects, coupler 130 is freely rotatable about a central axis of the coupler 130 if a central axis of the coupler 130 and a central axis 'A-A' of body 140 are not collinear. Coupler 130 may include a bearing (not shown) to enable rotation of the coupler 130. In aspects, coupler 130 may be rigidly fixed to the clamp equipped nozzle 100 such that, in order to couple the clamp equipped nozzle 100 to hose 10, the whole clamp equipped nozzle 100 is rotated about central axis 'A-A' or a central axis of the coupler 130 when threading coupler 130 on to hose end 12b. When coupler 130 is coupled to hose end 12b, fluid may flow from the hose 10 through the clamp equipped nozzle 100 and may exit via fluid outlet 120.

Coupler 130 may include male or female quick connectors to define a quick connect coupler (not shown) in the form of a clamp equipped quick connector. Quick connectors allow fast and easy coupling and removal between the clamp equipped nozzle 100 and a hose 10. Quick connectors remove the need to thread or screw coupler 130 to a corresponding male or female end of a hose 10. A quick connect coupler may be pushed or snapped into a corresponding quick connect coupler to form a fluid tight seal, and may be removed by pressing a button or simply pulling with sufficient force on the quick connect coupler to decouple the quick connect coupler. Any quick connect coupler known to those of ordinary skill the art may be used.

Figure 9:
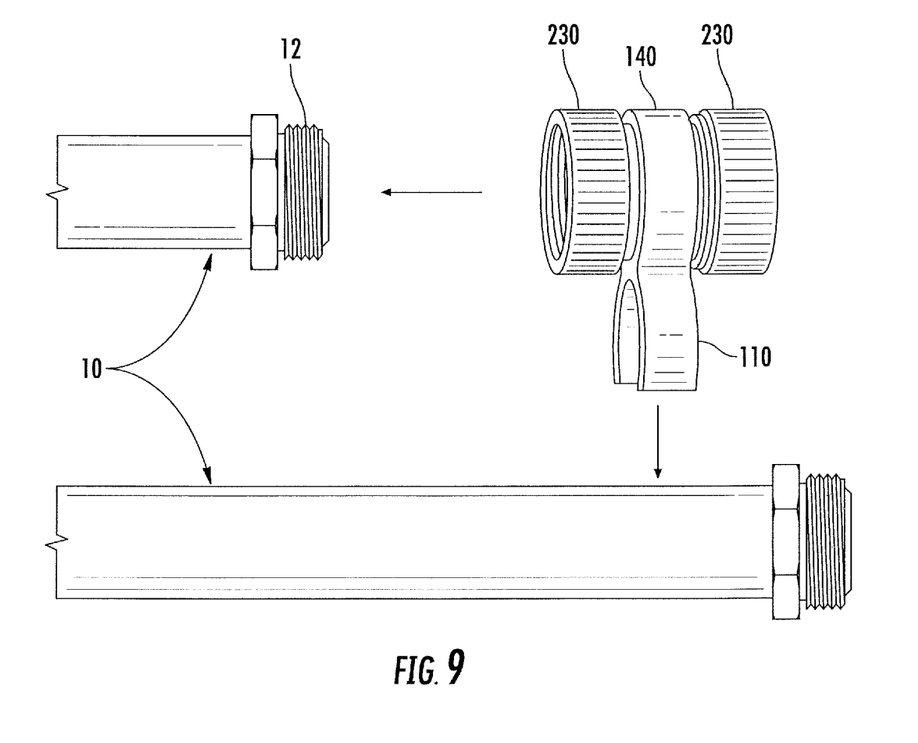
FIG. 9 is a side perspective view of another clamp equipped coupler in accordance with another aspect of this disclosure.

With additional reference to FIGS. 3A-3B, the clamp equipped nozzle 100 includes at least one clamp 110 configured to couple to and retain a section of hose 14 (see FIGS. 1 and 9). Clamp 110 is configured to retain hose 10 such that hose 10 does not decouple from clamp 110 while spooling the hose 10.

In aspects, clamp 110 is a cuff 110. In aspects, clamp 110 may be any clamp sufficient for retaining a section of hose therein. Cuff 110 includes walls 112 that are generally partially cylindrical or "C" shaped and have a curved inner surface 112a, and optionally a curved outer surface 112b. The ends of the walls 112 are spaced apart defining a longitudinal opening 114, the walls 112 and the longitudinal opening 114 cooperating to define a channel 116 for receiving a hose 10. In aspects, the clamp 110 may define an "arced" channel, such that when the clamp equipped nozzle 100 is used to facilitate spooling of the hose, the clamp retains an "arced" section of hose 14.

The walls 112 of the cuff 110 are configured to snap-fit a hose 10 or section of hose 14. In aspects, the cuff 110 may instead include a removable strap (not shown) spanning the longitudinal opening 114 to secure a hose 10 inserted into the channel 116 of the cuff 10. The cuff 110 may be configured to snap-fit a hose 10 and include the removable strap. The removable strap may include a hook and loop system, wherein the curved outer surface 112b includes either the hooks or the loops and the removable strap includes the corresponding loops or hooks, respectively, such that the removable strap may be removed at either one or both ends thereof. The removable strap may be secured to the outer surface by any strap securing mechanism known to those of ordinary skill in the art, such as, for example, a male protrusion configured to be received by a female receptacle each spaced apart and disposed on the removable strap or walls 112.

The cuff 110 may be made of plastic, rubber, metal, or any other suitable material. In aspects, cuff 110 includes rubber pads 118 (FIG. 3B) disposed on the curved inner surface 112a and/or at ends of the walls 112. Rubber pads 118 may be configured to reduce the potential of the walls 112 from puncturing or otherwise damaging a hose 10 inserted therein. The rubber pads 118 may also be configured to help retain the hose 10 by biasing the hose 10 against the walls 112 to ensure a snug snap-fit. Alternatively, the cuff 110 may include biasing members (not shown) similarly configured to help the cuff 110 retain the hose 10 inserted therein.

Cuff 110 includes a longitudinal length "L" (FIG. 2). Longitudinal length "L" may be any suitable length, for example, about 1 mm or greater. Longitudinal length "L" may vary depending on the diameter of the hose 10 to be secured and retained by cuff 110. For example, longitudinal length "L" may be about half an inch if securing a hose up to an eighth or quarter of an inch in diameter. In another example, longitudinal length "L" may be 3 inches for ¾ inch diameter garden hose. Longitudinal length "L" may be at least as long as the diameter of the hose to be clamped.

The walls 112 are spaced apart from one another so as to define a diameter "D2" therebetween, thereby also defining a diameter of the channel 116. Diameter "D2" may vary depending on the hose 10 to be secured and retained by cuff 110. For example, diameter "D2" may be about half an inch if securing a hose about half an inch in diameter. In aspects, diameter "D2" may be slightly less than the diameter of the hose 10 to be secured, such that the walls 112 form a snug snap-fit about the hose 10 to be secured.

With reference to FIG. 3B, clamp equipped nozzle 100 may include a plurality of clamps 110, such as cuffs 110a, 110b, and 110c. Each clamp or cuff 110a, 110b, and 110c may have the same diameter "D2" or longitudinal length "L" such that the clamp equipped nozzle 100 may clamp onto more than one section of hose 14. In aspects, cuffs 110a, 110b, and 110c may have different diameters "D2" or longitudinal lengths "L" such that the clamp equipped nozzle 100 may be used for hoses 10 of varying diameter.

Cuffs 110a, 110b, and 110c may be disposed on body 140 of the clamp equipped nozzle 100 in any suitable orientations or arrangement. For example, each clamp or cuff 110 may be disposed radially at 0°, 90°, and 180° about central axis 'A-A' of body 140. Alternatively, cuff 110a may be disposed at 60°, cuff 110b at 120°, and cuff 110c at 270° about central axis 'A-A' of body 140 in a "Y" configuration.

The body 140 of the clamp equipped nozzle 100 and the clamps 110 may be manufactured separately and then coupled together or may be formed as one unit, for example, via 3D printing or molding. In aspects, the clamp 110, fluid outlet 120, coupler 130 and body 140 may similarly be formed as a single unit.

With reference to FIGS. 4-7, various exemplary clamp equipped nozzles 100a, 100b, and 100c are illustrated and include a variety of fluid outlets 120a, 120b, 120c, and 120d, respectively. Fluid outlet 120 may be of any desirable shape and produce a variety of fluid flow patterns at the exit, as illustrated by fluid outlets 120a, 120b, 120c, and 120d. Fluid outlet 120 may produce a jet (fluid outlet 120a), cone, center, full, sprinkler, mist, flat, multi, or soaker fluid stream(s). In aspects, the fluid outlet 120 may include changeable fluid flow settings in a single fluid outlet 120. Fluid outlet 120 may be colinear with body 140 of the clamp equipped nozzle 100 or may be fluidly connected to body 140 in any desirable manner.

In aspects, clamps 110 may be used to store the clamp equipped nozzle 100 on the hose 10 when exchanging clamp equipped nozzles 100 for another clamp equipped nozzle with a different fluid outlet. For example, clamp equipped nozzle 100a and 100c may be stored on the hose 10 via cuffs 110 when clamp equipped nozzle 100b is coupled to the hose end 14.

Figure 4:
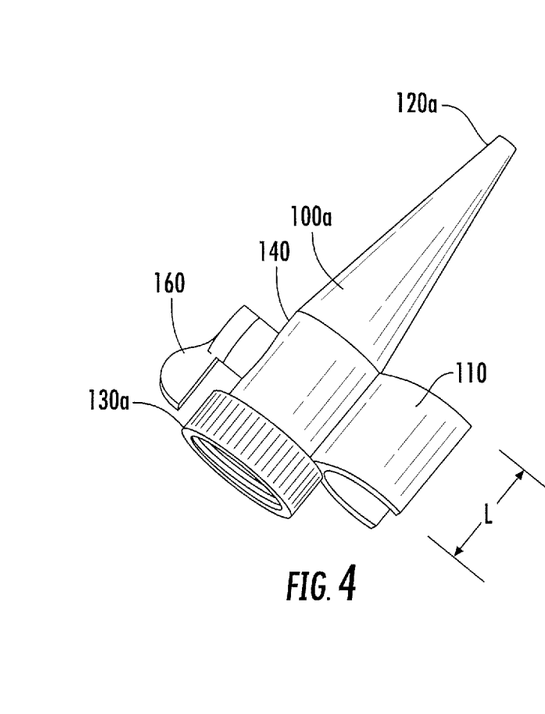
FIGS. 4-7 are perspective views of exemplary clamp equipped nozzles having various fluid outlets in accordance with aspects of this disclosure.
Figure 5:
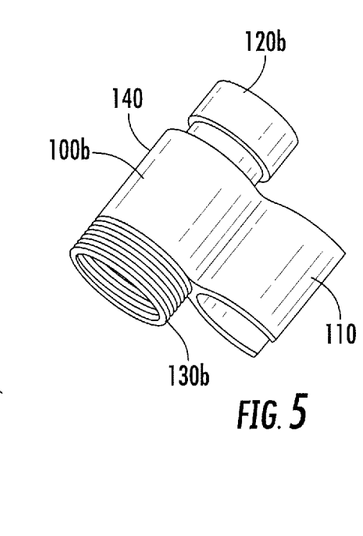
Figure 6:
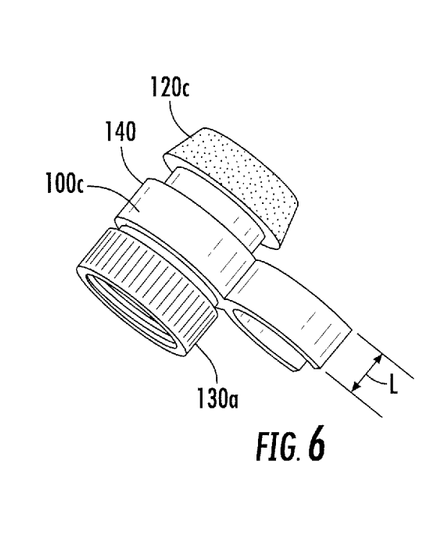
Figure 7:
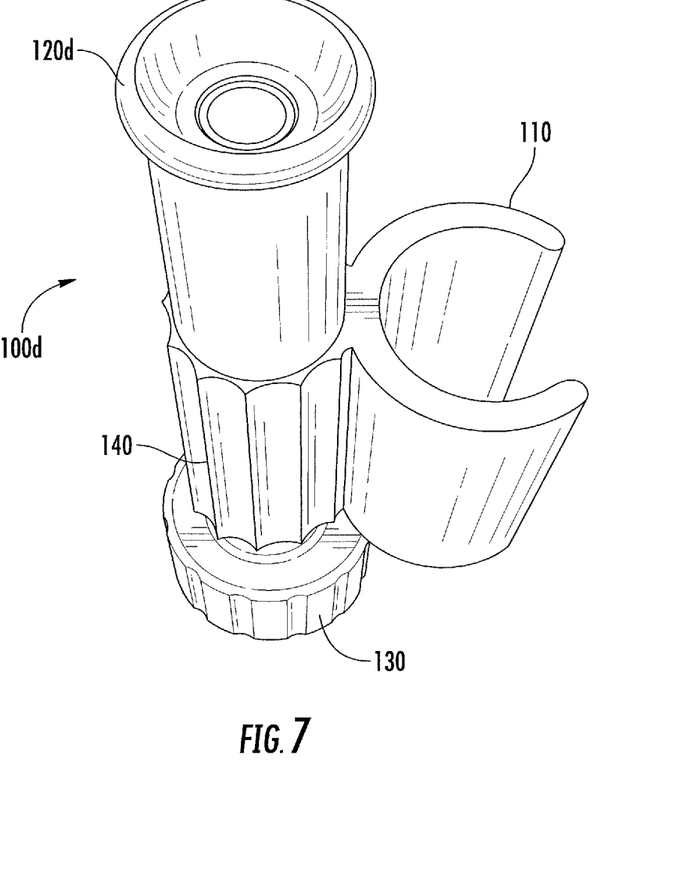

With reference to FIG. 4, the clamp equipped nozzle 100a includes a valve 160 configured to regulate the flow of fluid through the clamp equipped nozzle 100a. Valve 160 may be configured to stop the flow of fluid or regulate the flow rate of the fluid through the clamp equipped nozzle 100a. Valve 160 may be a ball valve, globe valve, gate valve, shut-off valve or any other similar suitable valve. Although illustrated with respect to the clamp equipped nozzle 100a, any clamp equipped nozzle of this disclosure may include valve 160. According to other aspects of this disclosure, the clamp equipped nozzle 100 may include a trigger (not shown) configured to enable fluid to exit out of or stop fluid from exiting fluid outlet 120. The trigger may be configured to control operation of valve 160. Clamp equipped nozzle 100 may include a handle and/or trigger system known to those of ordinary skill in the art.

With reference to FIGS. 8-10B, a clamp equipped coupler 200 may be coupled to a hose 10 or faucet 20 and includes body 140, clamp 110, and two couplers 230. Clamp equipped coupler 200 enables a connection between a hose 10 and another hose 10 or a faucet 20. One or both of couplers 230 may be quick connectors, in the form of clamp equipped quick connectors, which permit snap-fit fluid coupling between multiple hoses and/or between hoses and accessories (e.g., fluid nozzles, spigots, etc.). Alternatively, in accordance with the present disclosure, clamp equipped coupler 200 may be provided with screw-type fittings for standard connection to hoses, nozzles, spigots, and the like. Clamp equipped coupler 200 may be disconnected from the faucet 20 while remaining connected to hose 10, such that hose 10 may be inserted into the clamp 110 of the clamp equipped coupler 200 for easy and simple spooling of hose 10. Clamp equipped coupler 200 may include a female coupler 230a and a male coupler 230b, two female couplers 230a, or two male couplers 230b.

Figure 10A:
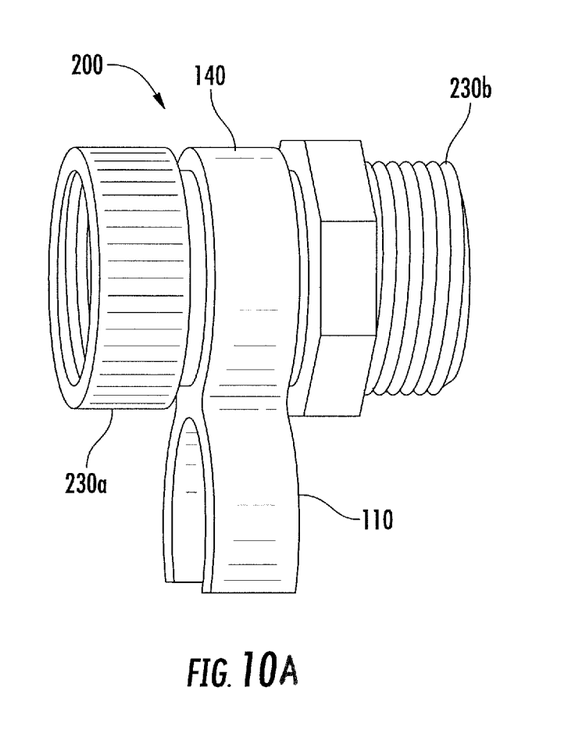
FIG. 10A is a side perspective view of a clamp equipped coupler having male and female ends in accordance with aspects of this disclosure.
Figure 10B:
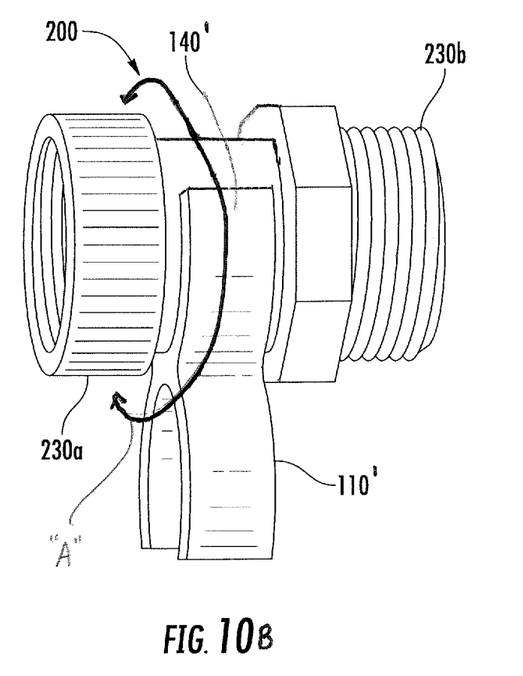
FIG. 10B is a side perspective view of another clamp equipped coupler having male and female ends in accordance with aspects of this disclosure, wherein the clamp is selectively connectable to the coupler.

With specific reference to FIG. 10B, clamp equipped coupler 200 may include a clamp 110' which includes a pair of C-shaped cuffs 140', wherein a first cuff is configured for snap-fit rotatable connection to a body of the coupler 200 (as illustrated by arrow "A"), and wherein a second cuff is configured for selective snap-fit connection to a hose or the like. While clamp 110' is shown connected to a coupler 200, it is contemplated and within the scope of the disclosure that clamp 110' may be used in connection with a water nozzle, sprayer or the like. Further, while shown as including a pair of C-shaped cuffs 140', clamp 110' may include twist-ties, cinch-ties, hook and loop fasteners, straps, threaded connectors, or any combination thereof.

Figure 11:
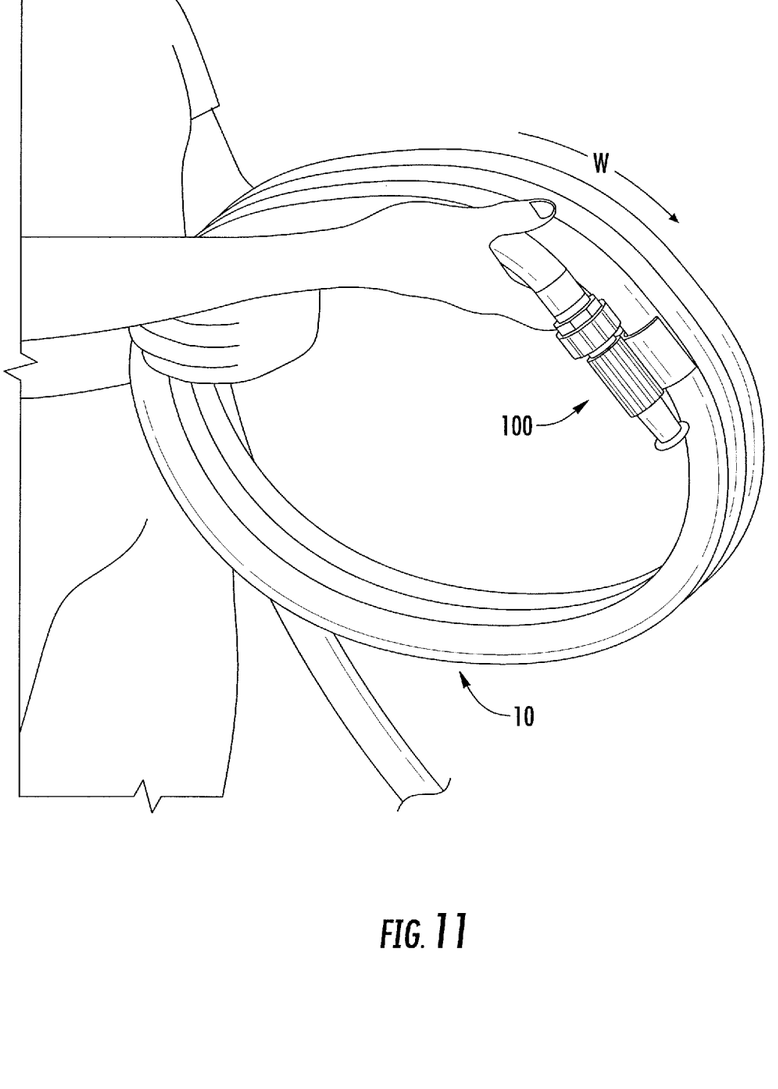
FIG. 11 is a diagram of a user spooling a hose using the clamp equipped nozzle of FIG. 1.

Referring again to FIGS. 1, 9, and 11, a user may insert the hose 10 into the clamp 110 of the clamp equipped nozzle 100 when the user desires to wind or spool the hose 10. A method for spooling a hose 10 includes coupling the clamp equipped nozzle 100 to the hose end 12. The hose 10 may be wound a first time as shown in FIG. 1 and then inserted into the clamp 110. With the hose 10 inserted into the clamp or cuff 110, the hose may be wound by passing from one hand to another hand (e.g., in a hand-over-hand manner) portions of the hose 10 in direction of arrows "W." If the clamp equipped nozzle 100 includes multiple clamps or cuffs 110, multiple sections of the hose 10 may insert various sections of the hose 10 into any remaining clamps or cuffs 110 at desired intervals. Clamp 110 is configured to retain the section of hose 12 of hose 10 while hose 10 is spooled.

The phrases "in an aspect," "in aspects," "in various aspects," "in some aspects," or "in other aspects" may each refer to one or more of the same or different aspects in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It will be understood that various modifications may be made to the aspects described by the present disclosure. Therefore, the above description should not be construed as limiting, but merely as exemplifications of various aspects. Those skilled in the art will envision other modifications within the scope and spirit of the present disclosure.

What is claimed is:

1. A clamp equipped nozzle for enabling spooling of a hose, comprising:
   a body defining a lumen having a central axis and configured to enable fluid to flow therethrough;
   a fluid outlet in fluid communication with the body, the fluid outlet disposed at a first end of the body, the fluid outlet configured to enable fluid to flow out of the clamp equipped nozzle defining a flow pattern;
   a coupler configured to couple the body to an end of the hose, the coupler disposed at a second end of the body; and
   a clamp configured to retain a section of the hose, the clamp including walls in a cylindrical configuration, the walls defining a longitudinal length that is approximately parallel the body, the clamp disposed along a longitudinal portion of the body, wherein the clamp includes a rubber pad configured to bias a section of hose to be clamped against inner surfaces of the walls.

2. The clamp equipped nozzle of claim 1, wherein the walls of the clamp define a cylindrical C-shaped channel, the channel having a diameter from about 9 millimeters to about 20 millimeters.

3. The clamp equipped nozzle of claim 1, wherein the coupler and fluid outlet are collinear with the central axis.

4. The clamp equipped nozzle of claim 1, wherein the walls define a pair of arms, wherein ends of the arms of the clamp are spaced apart to define a longitudinal opening configured to permit a section of the hose to be inserted into the clamp, the arms configured to snap-fit the hose.

5. The clamp equipped nozzle of claim 1, wherein the coupler is a female threaded cap configured to couple to a male threaded end of the hose to be retained by the clamp, the female threaded cap configured to rotate about a central axis of the coupler.

6. The clamp equipped nozzle of claim 1, wherein the coupler is a male threaded coupler configured to be threadably inserted into a female threaded end of the hose to be retained by the clamp.

7. The clamp equipped nozzle of claim 1, wherein the fluid outlet is configured to permit fluid to flow out of the body in a jet, cone, center, full, sprinkler, mist, flat, multistream, or soaker flow pattern.

8. A clamp equipped nozzle for enabling spooling of a hose, comprising:
   a body defining a lumen having a central axis and configured to enable fluid to flow therethrough;
   a fluid outlet in fluid communication with the body, the fluid outlet disposed at a first end of the body, the fluid outlet configured to enable fluid to flow out of the clamp equipped nozzle defining a flow pattern;
   a coupler configured to couple the body to an end of the hose, the coupler disposed at a second end of the body; and
   a clamp configured to retain a section of the hose, the clamp including walls in a cylindrical configuration, the walls defining a longitudinal length that is approximately parallel the body, the clamp disposed along a longitudinal portion of the body;
   wherein the clamp equipped nozzle is configured for use in combination with a quick connect coupler having a male coupler and a female coupler, wherein one of the male coupler and the female coupler of the quick connect coupler is configured to couple to another end of the hose to be clamped or to a different hose or faucet, wherein the quick connect coupler is configured to fluidly connect to the clamp equipped nozzle, and wherein the quick connect coupler includes a quick connect coupler clamp configured to retain a section of the hose, the quick connect coupler clamp including walls in a cylindrical configuration, the walls of the quick connect coupler clamp defining a longitudinal length that is approximately parallel the body, the quick connect coupler clamp disposed along a longitudinal portion of a body of the quick connect coupler.

9. A clamp equipped nozzle for enabling spooling of a hose, comprising:
- a body defining a lumen having a central axis and configured to enable fluid to flow therethrough;
- a fluid outlet in fluid communication with the body, the fluid outlet disposed at a first end of the body, the fluid outlet configured to enable fluid to flow out of the clamp equipped nozzle defining a flow pattern;
- a coupler configured to couple the body to an end of the hose, the coupler disposed at a second end of the body;
- a clamp configured to retain a section of the hose, the clamp including walls in a cylindrical configuration, the walls defining a longitudinal length that is approximately parallel the body, the clamp disposed along a longitudinal portion of the body; and
- a plurality of clamps, each clamp of the plurality of clamps configured to retain a section of the hose.

10. The clamp equipped nozzle of claim 9, wherein each clamp of the plurality of clamps is disposed radially about the central axis of the body.

11. The clamp equipped nozzle of claim 9, wherein at least two clamps of the plurality of clamps are configured to define a different diameter from one another to retain hoses having different diameters.

12. The clamp equipped nozzle of claim 1, wherein the clamp includes a first cuff having a C-shaped channel configured to snap-fit engage a portion of a hose, and a second cuff having a C-shaped channel configured to snap-fit engage the body of the nozzle.

13. The clamp equipped nozzle of claim 8, wherein the coupler and fluid outlet are collinear with the central axis.

14. The clamp equipped nozzle of claim 8, wherein the walls define a pair of arms, wherein ends of the arms of the clamp are spaced apart to define a longitudinal opening configured to permit a section of the hose to be inserted into the clamp, the arms configured to snap-fit the hose.

15. The clamp equipped nozzle of claim 8, wherein the coupler is a female threaded cap configured to couple to a male threaded end of the hose to be retained by the clamp, the female threaded cap configured to rotate about a central axis of the coupler.

16. The clamp equipped nozzle of claim 8, wherein the coupler is a male threaded coupler configured to be threadably inserted into a female threaded end of the hose to be retained by the clamp.

17. The clamp equipped nozzle of claim 9, wherein the coupler and fluid outlet are collinear with the central axis.

18. The clamp equipped nozzle of claim 9, wherein the walls define a pair of arms, wherein ends of the arms of the clamp are spaced apart to define a longitudinal opening configured to permit a section of the hose to be inserted into the clamp, the arms configured to snap-fit the hose.

19. The clamp equipped nozzle of claim 9, wherein the coupler is a female threaded cap configured to couple to a male threaded end of the hose to be retained by the clamp, the female threaded cap configured to rotate about a central axis of the coupler.

20. The clamp equipped nozzle of claim 9, wherein the coupler is a male threaded coupler configured to be threadably inserted into a female threaded end of the hose to be retained by the clamp.

* * * * *